Figure 1:
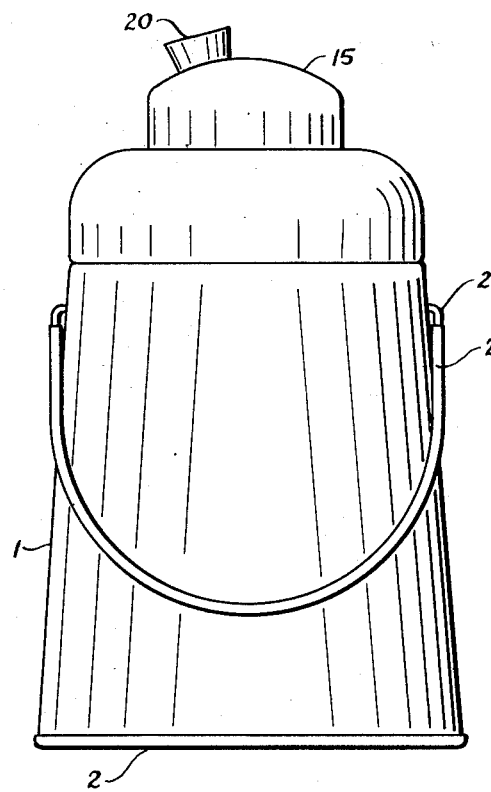

April 9, 1957   J. D. BROWN   2,788,149
INSULATED CONTAINER
Filed Jan. 6, 1954

INVENTOR.
JOSEPH D. BROWN
BY Mock - Blum
ATTORNEYS

United States Patent Office 2,788,149
Patented Apr. 9, 1957

2,788,149

INSULATED CONTAINER

Joseph D. Brown, Eastchester, N. Y., assignor to Poloron Products, Inc., New Rochelle, N. Y., a corporation of New York Application January 6, 1954, Serial No. 402,454

1 Claim. (Cl. 215—13)

The present invention relates generally to insulated containers, and is particularly directed to insulated containers of the type having a glass or earthenware inner element or lining and adapted for containing liquids.

The particular embodiment of the present invention which is illustrated in the drawings and which will be described hereinafter in greater detail, comprises generally an open top casing for spacedly receiving an inner element or liner, and a cover over the casing top and adapted for connection to the liner, so that the casing, liner and cover combine to define a chamber surrounding the liner and adapted to hold insulating material.

As is well known to those versed in the art, prior insulated container constructions have been subject to serious disadvantages under practical conditions of use. One common type construction is that which includes inner and outer container elements defining a chamber therebetween, which chamber is permanently sealed to maintain a vacuum therein. Obviously, any leakage through the seal renders the container incapable of its insulating function, and repair of the container requires re-evacuation and sealing of the chamber, a difficult and specialized process. Of course, breakage of one of the container elements, which frequently occurs when the lining element is formed of glass or similar material for containing liquids, renders the device substantially useless and incapable of being repaired. The latter difficulty is also true of previous insulated containers which include a quantity of insulating material disposed in the space between inner and outer container elements.

Accordingly, it is a general object of the present invention to provide an improved and efficient insulated container of the type described in which the inner or lining element may be readily be removed and replaced without the use of special tools or a high degree of skill. More particularly, the present invention contemplates the employment of a conventional bottle or jar, such as a Mason jar, as the inner element or liner, and an easily separable outer container element or casing to permit removal and replacement of the liner.

It is another object of the present invention to provide an insulated container having the characteristics mentioned in the foregoing paragraph, and including inner and outer container elements which in their assembled condition combine to provide a relatively staunch, unitary structure, and which may be quickly and easily disassembled, as for repairs, and reassembled without special skill or equipment. Specifically, the insulated container of the present invention is of the type employing insulating material, rather than a vacuum and its associated seals; and, the instant device utilizes novel features of construction permitting detachment and securement of the above mentioned cover member with respect to the casing, thereby permitting removal and replacement of the inner element when the cover member is detached.

It is a further object of the present invention to provide an insulated container of the type described which is simple in construction, requiring a minimum of parts, rugged and durable in use, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

Figure 2:
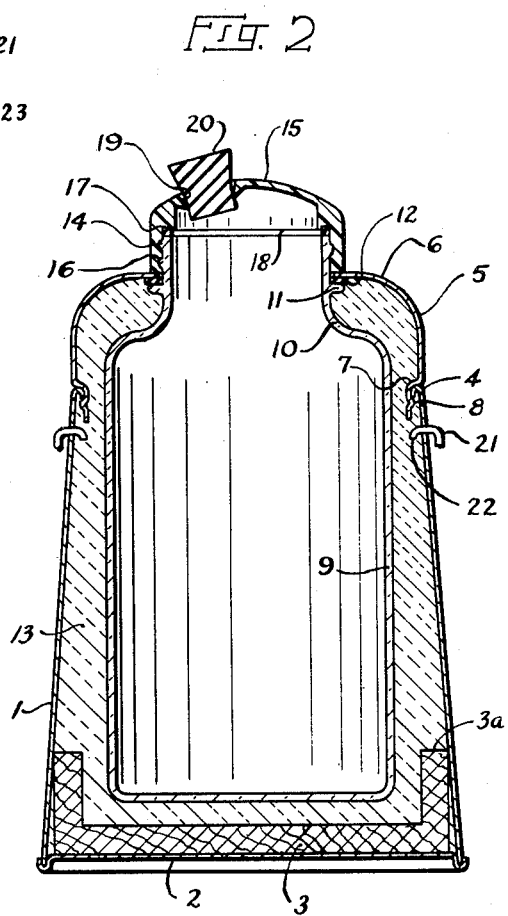

In the drawings:

Figure 1 is a an elevational view showing an insulated container constructed in accordance with the present invention; and Figure 2 is a longitudinal sectional view showing the container device of Figure 1.

Referring now more particularly to the drawings, the illustrated embodiment comprises a generally tubular, preferably tapering side wall or casing 1, which has its lower end or bottom closed by a plate or closure 2 having its peripheral edge portion rolled about and fixedly secured to the lower edge portion of the casing side wall 1.

In order to structurally rigidify the casing side wall 1 and bottom wall or closure 2, a reinforcing bar 3 is disposed within the casing to extend transversely across the bottom wall thereof, and is provided with upstanding end portions or legs 3a, the reinforcing bar and its upstanding legs being preferably secured, by any suitable means, to the casing bottom and side walls, respectively. If desired, an additional rigidifying member or bar (not shown) may be secured transversely of the bar 3. The top or upper end portion 4 of the casing is rolled or bent inwardly to form a peripherally extending inturned lip, for a purpose appearing presently.

Arranged above the casing 1 is a cowl-like cover member which includes an annular or tubular portion 5, and an inturned upper portion or flange 6 extending circumferentially about the annular portion 5. Depending from the annular portion of the cover member, and offset radially inwardly therefrom is a peripheral skirt 7 adapted for insertion inwardly through the upper end portion 4 of the casing 1. The skirt is formed with a peripherally extending, external bead or detent 8 which engages below the casing lip 4 to hold the cover member in position on the casing. Stated otherwise, the external bead or detent 8 combines with the skirt 7 to define an outwardly facing groove for snugly receiving the casing lip. As will be described more fully hereinafter, the casing lip 4 and cover skirt 7 define inter-engaging means for detachably securing the cover member about the upper end of the casing.

Disposed spacedly within the casing 1 is a conventional bottle or jar 9, having its reduced neck or mouth portion 10 projecting outwardly through the upper casing end. While it is preferred to arrange the bottle or jar 9, which constitutes the inner container element or liner, with its bottom wall spaced above the reinforcing bar 3 to permit more effective insulation, it may be desirable under certain conditions, as when relatively large inner elements are used, to more firmly support the jar by seating it directly on the reinforcing bar. Extending about the jar mouth portion is formed an external, annular ledge 11, upon which is seated a sealing ring or gasket 12, the ledge and gasket combining to provide an upwardly facing shoulder or abutment for firm, bearing engagement with the underside of the cover flange 6.

In assembling the elements thus far described, the outer container element or casing 1 is lined with suitable insulating material 13, such as that formed of glass fibers or the like, so as to provide a cavity substantially the size and shape of the jar 9. The jar is then inserted bottom first into the cavity with its mouth portion projecting therefrom. Additional insulating material may then be disposed about the jar mouth portion, below the ledge 11, and the gasket 12 seated on the upper surface of the ledge. The cover member 5 is then arranged above the casing 1, circumposed about the jar mouth portion, and the skirt 7 inserted into the upper casing end 4. Upon downward movement of the cover member 5, the skirt 8 and lip 4 will snap into interlocking engagement, and the inner peripheral portion of the cover member flange 6 will bear firmly against the upper surface of the gasket 12. Hence, it is now seen that the casing 1, jar 9 and cover member 5 combine in their assembled condition to provide a staunch, unitary structure.

Exteriorly of the jar or bottle mouth portion are formed screw threads 14 for engagement with the internal screw thread 16 of the cap or closure 15. That is, the cap or closure 15 is adapted for threaded engagement about the jar or bottle mouth portion, so as to be removably secured in closing relation with respect to the inner container element 9. Further, the cap 15 is formed with a downwardly facing, annular groove 17 in which seats a gasket or sealing ring 18 overlying the rim of the jar mouth. When the cap is screwed down over the jar mouth, as seen in Fig. 2, the gasket 18 will engage with the rim of the jar mouth to seal the latter, and the lower edge of the cap will engage with the upper surface of the cover member flange 6, so that the latter is clamped between the abutment or shoulder composed of ledge 11 and gasket 12, and the bottle cap. In this manner, the structural rigidity of the container is increased to permit rough handling cover member, and hence, with respect to the casing 1 and abuse without damage.

Formed in the crown of the cap 15 is a through hole or aperture 19 which snugly receives the stopper or plug 20. The stopper is provided to facilitate pouring of liquid contents from the insulated container. That is, the relatively small pouring aperture 19 permits more accurate pouring and limits the passage of heat between the interior and exterior of the container. The relatively large cap or closure 15 serves to expedite filling of the liner 9, or rapid emptying of the container, if desired, and also affords greater access to the interior of the liner for cleaning purposes.

For convenient portability, the container is provided a generally U-shaped bail 21 having hooked end portions 22 extending rotatably through opposite sides of the casing 1. Exteriorly of the casing, the bail 21 is provided with a carrying cover or sheath 23, preferably fabricated of relatively soft, non-slip material for ease and safety in handling.

In use, the container of the present invention is substantially identical to prior insulated containers, it being necessary to avoid sudden temperature changes of the jar or liner 9 liable to crack the same. However, in this event, it is only necessary to unscrew and remove the cap 15, and separate the cover member 5 from the casing 1. This may be accomplished by simply wedging a blade into the juncture of the cover member and casing, and prying the former upwards so as release the skirt 7 from its interengaging relation with the lip 4. The gasket 12 may then be removed from the ledge 11, and the casing 1 inverted and agitated to dislodge and remove the broken liner pieces. A replacement jar or liner may then be inserted in the cavity of the insulating material 13, the gasket 12 replaced on the jar ledge, and the cover member 5 snapped into engagement with the casing 1, as described hereinbefore. In this manner, a conventional jar or bottle, such as a Mason jar, may be inserted in the jacket composed of the casing and cover member to provide an insulated container having substantially its original operating efficiency.

In view of the foregoing, it is seen that the present invention provides an insulated container which fully accomplishes its intended objects, and which is well adapted to meet practical conditions of use.

Although the present invention has been described in some detail by way of illustration and example for purposes of clarity of understanding, it is understood that certain changes and modifications may be made within the spirit of the invention and scope of the appended claim.

What is claimed is:

An insulated container comprising a casing having a closed bottom and an open top, a dome-like casing cover releasably secured at its lower edge to the top of said casing to close same, said casing cover having a top opening, a jar-like inner element disposed spacedly in upright position wtihin said casing and having an externally threaded neck portion extending upwardly through said cover top opening, said neck portion having a transverse peripheral flange on its outer face of greater diameter than said cover top opening and of less diameter than said casing and positioned below the top of said casing cover, yieldable insulating material disposed within said casing externally of said inner element and positioned and adapted normally to support said inner element with said flange proximate to said cover top wall, and a removable screw cap adapted to be screwed upon said neck portion to close the mouth thereof, said cover top wall being thereby adapted to be clamped between the lower edge of said cap and the upper face of said flange so as to seal the inner space of said casing.

References Cited in the file of this patent

UNITED STATES PATENTS

| 1,435,199 | Blair | Nov. 14, 1922 |
| 1,771,123 | Johnson | July 22, 1930 |
| 1,855,039 | Wetmore | Apr. 19, 1932 |
| 2,077,218 | Conner | Apr. 13, 1937 |
| 2,163,056 | Payson et al. | June 20, 1939 |
| 2,563,508 | Anschicks | Aug. 7, 1951 |

FOREIGN PATENTS

| 111,755 | Switzerland | Sept. 1, 1925 |